United States Patent
Mehta et al.

(10) Patent No.: US 8,839,374 B1
(45) Date of Patent: Sep. 16, 2014

(54) SYSTEMS AND METHODS FOR IDENTIFYING SECURITY RISKS IN DOWNLOADS

(75) Inventors: Shreyans Mehta, Fremont, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 56 days.

(21) Appl. No.: 13/326,995

(22) Filed: Dec. 15, 2011

(51) Int. Cl.
G06F 7/04 (2006.01)
H04L 29/06 (2006.01)

(52) U.S. Cl.
CPC ............... *H04L 63/08* (2013.01); *H04L 63/10* (2013.01)
USPC .......................................................... 726/4

(58) Field of Classification Search
None
See application file for complete search history.

(56) References Cited

U.S. PATENT DOCUMENTS

| | | | |
|---|---|---|---|
| 7,640,586 B1 * | 12/2009 | Johnson et al. | 726/24 |
| 7,725,941 B1 * | 5/2010 | Pavlyushchik | 726/24 |
| 8,307,432 B1 * | 11/2012 | Feng | 726/22 |
| 2005/0005160 A1 * | 1/2005 | Bates et al. | 713/200 |
| 2008/0028466 A1 * | 1/2008 | Burtscher | 726/23 |
| 2008/0295176 A1 * | 11/2008 | Holostov et al. | 726/24 |
| 2009/0307776 A1 * | 12/2009 | Curnyn | 726/24 |
| 2010/0088349 A1 * | 4/2010 | Parab | 707/802 |
| 2010/0115619 A1 * | 5/2010 | Burtscher | 726/24 |
| 2010/0115620 A1 * | 5/2010 | Alme | 726/24 |
| 2010/0146621 A1 * | 6/2010 | Kim et al. | 726/22 |
| 2010/0154056 A1 * | 6/2010 | Smith et al. | 726/22 |
| 2010/0281540 A1 * | 11/2010 | Alme | 726/23 |
| 2012/0260343 A1 * | 10/2012 | Sun et al. | 726/24 |
| 2012/0297487 A1 * | 11/2012 | Xia | 726/24 |
| 2013/0042320 A1 * | 2/2013 | Hearnden et al. | 726/22 |

* cited by examiner

*Primary Examiner* — Jeffrey Pwu
*Assistant Examiner* — Carlos Amorin
(74) *Attorney, Agent, or Firm* — ALG Intellectual Property, LLC

(57) ABSTRACT

A computer-implemented method for identifying security risks in downloads may include (1) identifying a request to download a file that is subject to a security assessment, (2) determining that a first segment of the file is required for the security assessment, (3) based on determining that the first segment of the file is required for the security assessment, retrieving the first segment of the file before retrieving a second segment of the file, and (4) determining, based at least in part on the first segment, that the file includes a security risk. Various other methods, systems, and computer-readable media are also disclosed.

20 Claims, 6 Drawing Sheets

SYSTEMS AND METHODS FOR IDENTIFYING SECURITY RISKS IN DOWNLOADS

BACKGROUND

Consumers and businesses face a growing tide of malicious software that threatens the stability and performance of their computers and the security of their data. Computer programmers with malicious motivations have created and continue to create viruses, Trojan horses, worms, and other programs in an attempt to compromise computer systems. These malicious programs are often referred to as malware. In an attempt to evade detection, malicious programmers may even inject malware into or among legitimate programs.

In recent years, the Internet has become a major vector for malware propagation. Accordingly, traditional security systems may scan recently downloaded files for malware. Unfortunately, by the time a malicious file has been downloaded, the malicious file may have already caused wasted time and computing resources. For example, a user downloading a large file may have to wait until the file is downloaded (and the traditional security system has had time to scan the file) before learning that the file is malicious. Furthermore, downloading a large malicious file may waste computing resources (e.g., network resources, I/O resources, etc.). Accordingly, the instant disclosure identifies and addresses a need for additional and improved systems and methods for identifying security risks in downloads.

SUMMARY

As will be described in greater detail below, the instant disclosure generally relates to systems and methods for identifying security risks in downloads by determining the order in which one or more portions of a file are downloaded such that portions of the file needed for a security assessment are downloaded first. In one example, a computer-implemented method for identifying security risks in downloads may include (1) identifying a request to download a file that is subject to a security assessment, (2) determining that a first segment of the file is required for the security assessment, (3) based on determining that the first segment of the file is required for the security assessment, retrieving the first segment of the file before retrieving a second segment of the file, and (4) determining, based at least in part on the first segment, that the file includes a security risk.

In some examples, determining that the first segment of the file is required for the security assessment may include (1) identifying a layout segment of the file, the layout segment including layout information for the file and (2) identifying the first segment of the file based on the layout information. Additionally or alternatively, determining that the first segment of the file is required for the malware assessment may be based at least in part on a type of the file. In some examples, the second segment may precede the first segment in the file.

In some embodiments, determining that the file includes the security risk may include identifying a malware signature within the first segment. Additionally or alternatively, determining that the file includes the security risk may include (1) identifying, based at least in part on the first segment, a third segment of the file that is required for the malware assessment and (2) based on determining that the third segment of the file is required for the malware assessment, retrieving the third segment of the file before retrieving the second segment of the file. In at least one example, determining that the file includes the security risk may include determining that the file includes the security risk before downloading the entire file. Additionally, determining that the file includes the security risk may include terminating an attempt to download the file before retrieving the second segment based on determining that the file includes the security risk.

In one embodiment, a system for implementing the above-described method may include (1) an identification module programmed to identify a request to download a file that is subject to a security assessment, (2) a determination module programmed to determine that a first segment of the file is required for the security assessment, (3) a retrieval module programmed to, based on determining that the first segment of the file is required for the security assessment, retrieve the first segment of the file before retrieving a second segment of the file, and (4) an assessment module programmed to determine, based at least in part on the first segment, that the file includes a security risk. The system may also include at least one processor configured to execute the identification module, the determination module, the retrieval module, and the assessment module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a request to download a file that is subject to a security assessment, (2) determine that a first segment of the file is required for the security assessment, (3) based on determining that the first segment of the file is required for the security assessment, retrieve the first segment of the file before retrieving a second segment of the file, and (4) determine, based at least in part on the first segment, that the file includes a security risk.

As will be explained in greater detail below, by determining the order in which one or more portions of a file are downloaded such that portions of the file needed for a security assessment are downloaded first, the systems and methods described herein may identify security risks in downloads earlier (e.g., without waiting for a file to entirely download or waiting for relevant portions of the file to download in order), thereby potentially saving time and/or computing resources (e.g., network bandwidth, I/O resources, etc.).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
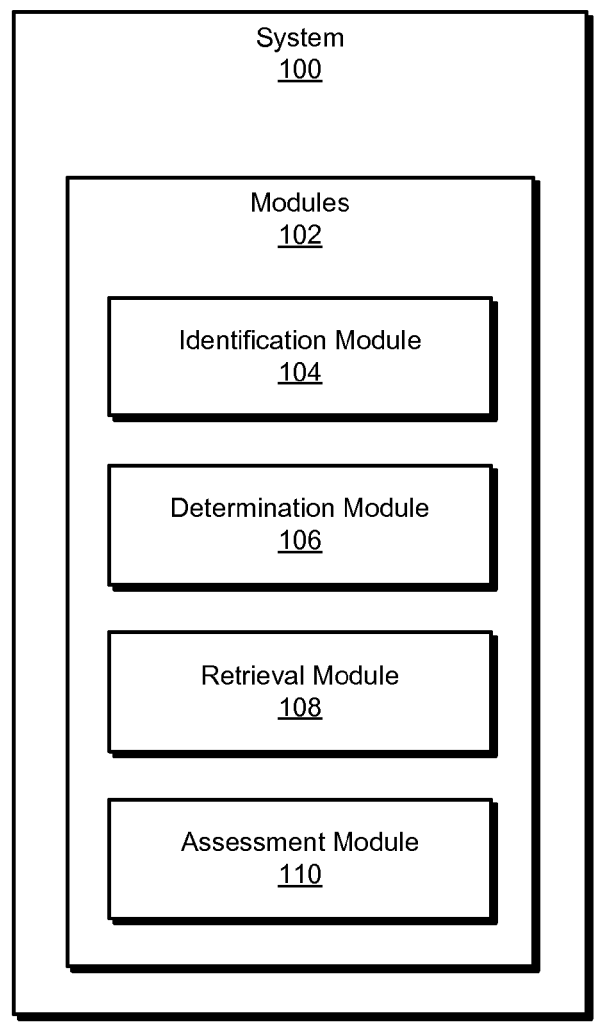
FIG. 1 is a block diagram of an exemplary system for identifying security risks in downloads.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
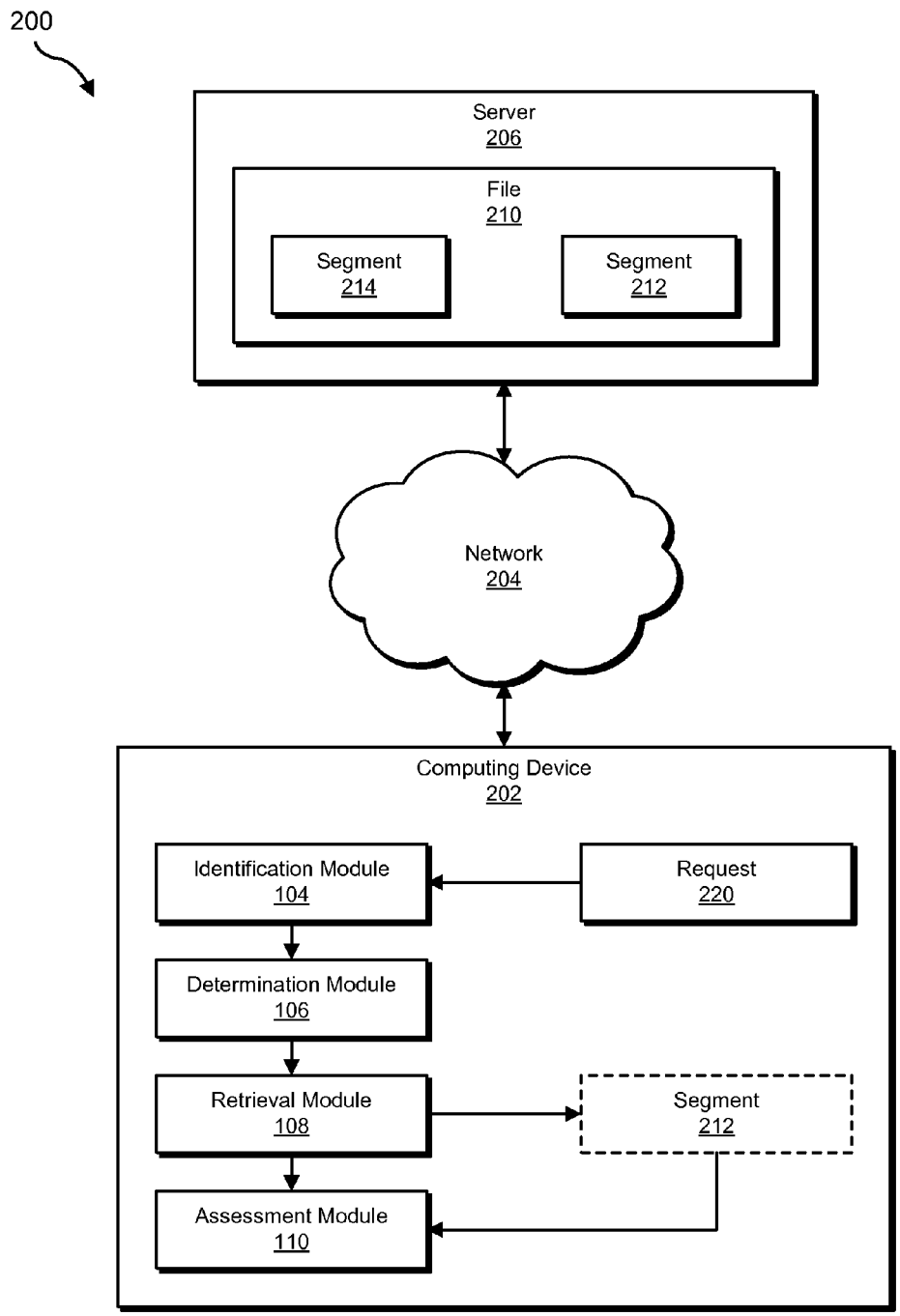
FIG. 2 is a block diagram of an exemplary system for identifying security risks in downloads.
Figure 3:
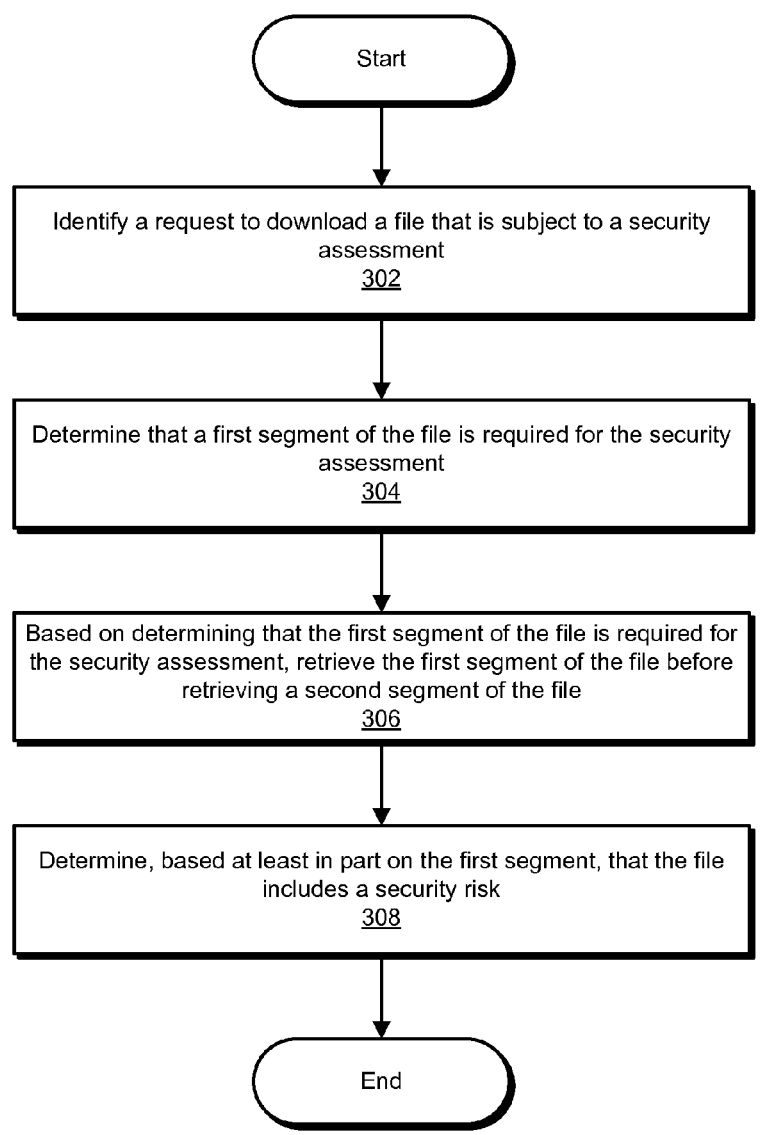
FIG. 3 is a flow diagram of an exemplary method for identifying security risks in downloads.
Figure 4:
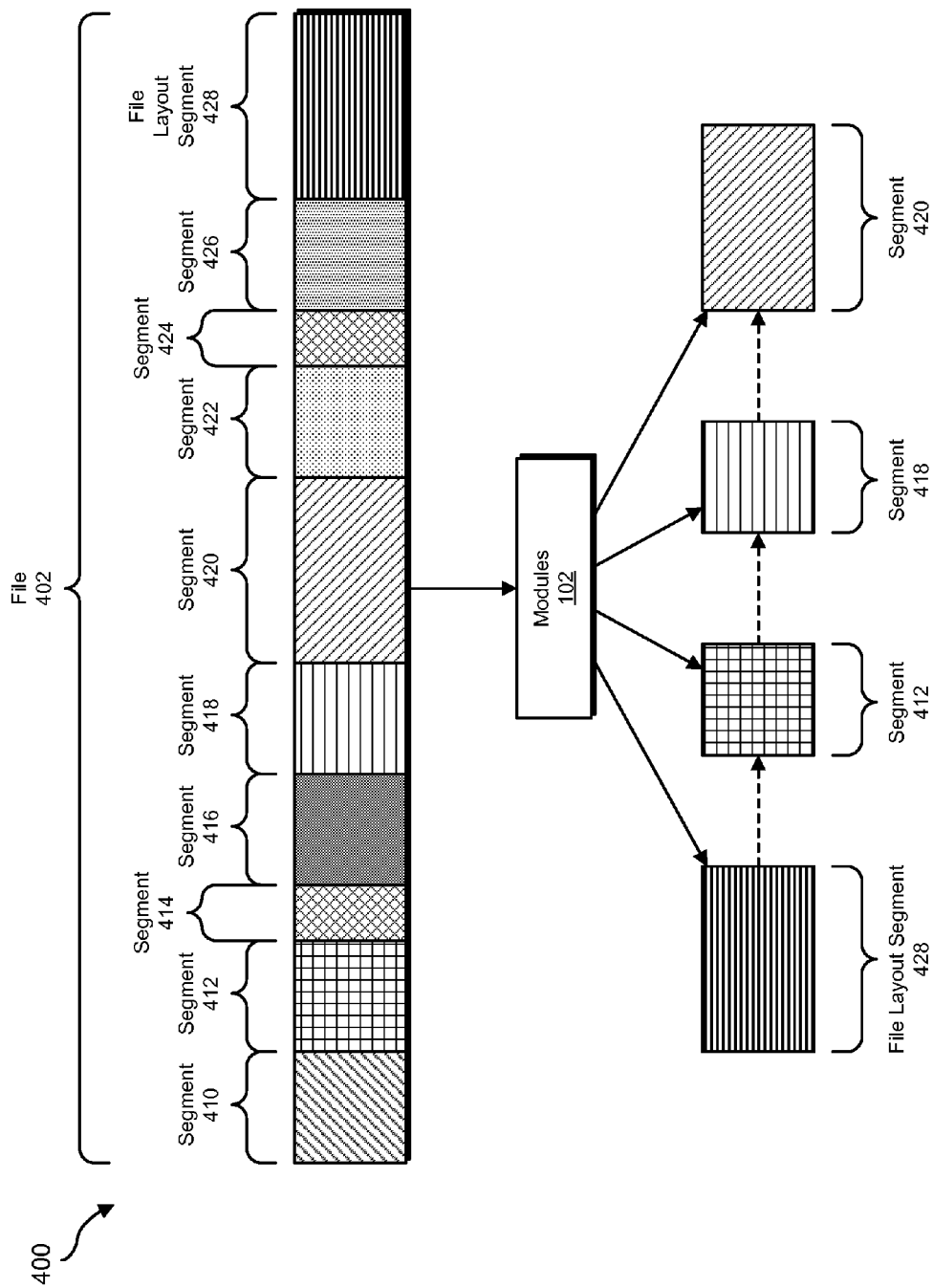
FIG. 4 is a block diagram of an exemplary system for identifying security risks in downloads.

The following will provide, with reference to FIGS. 1, 2, and 4, detailed descriptions of exemplary systems for identifying security risks in downloads. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for identifying security risks in downloads. As illustrated in this figure, exemplary system 100 may include one or more modules 102 for performing one or more tasks. For example, and as will be explained in greater detail below, exemplary system 100 may include an identification module 104 programmed to identify a request to download a file that is subject to a security assessment. Exemplary system 100 may also include a determination module 106 programmed to determine that a first segment of the file is required for the security assessment. Exemplary system 100 may also include a retrieval module 108 programmed to, based on determining that the first segment of the file is required for the security assessment, retrieve the first segment of the file before retrieving a second segment of the file.

In addition, and as will be described in greater detail below, exemplary system 100 may include an assessment module 110 programmed to determine, based at least in part on the first segment, that the file includes a security risk. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, identification module 104, determination module 106, retrieval module 108, and/or assessment module 110 from FIG. 1 may, when executed by at least one processor of computing device 202, facilitate computing device 202 in identifying security risks in downloads. For example, and as will be described in greater detail below, one or more of modules 102 may cause computing device 202 to (1) identify a request (e.g., request 220) to download a file (e.g., file 210 on server 206) that is subject to a security assessment, (2) determine that a first segment of the file (e.g., segment 212) is required for the security assessment, (3) based on determining that the first segment of the file is required for the security assessment, retrieve the first segment of the file before retrieving a second segment of the file (e.g., based on determining that segment 212 is required for the security assessment, retrieve segment 212 before retrieving segment 214 of file 210), and (4) determine, based at least in part on the first segment, that the file includes a security risk (e.g., determine, based at least in part on segment 212, that file 210 includes a security risk).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of storing, hosting, relaying, and/or transmitting one or more files. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for identifying security risks in downloads. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a request to download a file that is subject to a security assessment. For example, at step 302 identification module 104 may, as part of computing device 202 in FIG. 2, identify request 220 to download file 210 on server 206 (e.g., to computing device 202).

As used herein, the term "file" may refer to any unit of data, including, without limitation, files, data objects, images, packages, databases, and documents. In some examples, the file may include an executable file and/or one or more computer-executable instructions. As used herein, the phrase "security assessment" may refer to any suitable security assessment, analysis, and/or scan. For example, the security assessment may include a malware scan, an intrusion prevention analysis, etc. As used herein, the term "malware" may refer to any virus, worm, Trojan horse, spyware, and/or any other malicious, illegitimate, and/or unauthorized software.

As used herein, the term "request" may refer to any of a variety of requests, communications, commands, messages, and/or instructions. For example, the request may include a Hypertext Transfer Protocol ("HTTP") request. Additionally or alternatively, the request may include a File Transfer Protocol ("FTP") request. In some examples, the request may include a peer-to-peer file sharing request.

Identification module 104 may identify the request in any of a variety of contexts. For example, identification module 104 may identify the request as a part of a download manager (e.g., an application for downloading files, a web browser plug-in for downloading files, etc.) that has received and/or generated the request. Additionally or alternatively, identification module 104 may identify the request as a part of a proxy that has received and/or intercepted the request. In some examples, identification module 104 may identify the request as a part of a web crawler that generates batches of requests to analyze files on the Internet.

FIG. 4 is an illustration of an exemplary system 400 for identifying security risks in downloads. Using FIG. 4 as an example, at step 302 identification module 104 may identify a request to download a file 402.

Returning to FIG. 3, at step 304 one or more of the systems described herein may determine that a first segment of the file is required for the security assessment. For example, at step 304 determination module 106 may, as part of computing device 202 in FIG. 2, determine that segment 212 of file 210 is required for the security assessment.

As used herein, the term "segment" may refer to any discrete unit of data within a file. In some examples, the term "segment" may refer to a fixed-size unit of data within a file. For example, the term "segment" may refer to a block, a sector, and/or an arbitrarily defined fixed-size unit of data. In some examples, the term "segment" may refer to a contiguous data region within a file. For example, the term "segment" may refer to an extent and/or range of data within a file. Generally, the term "segment" may refer to any section and/or portion of a file.

Determination module 106 may determine that the first segment of the file is required for the security assessment in any of a variety of ways. In some examples, determination module 106 may identify a layout segment of the file, the layout segment including layout information for the file. The layout segment may include the layout information in any suitable format. For example, the layout segment may include metadata indicating the offsets of one or more sections within the file. In some examples, the layout segment may include a "dictionary" at the end of the file indicating the location within the file of one or more sections of the file. After identifying the layout segment of the file, determination module 106 may identify the first segment of the file based on the layout information. For example, determination module 106 may identify the first segment within a section of interest within the file as indicated by the layout information (and, e.g., a security heuristic).

Using FIG. 4 as an example, file 402 may include segments 410, 412, 414, 416, 418, 420, 422, 424, and 426, as well as a file layout segment 428 at the end of file 402. In this example, one or more of the systems described herein may download file layout segment 428 first (e.g., before downloading any other segments of the file). Determination module 106 may then identify segment 412 as a segment of interest to the security assessment and determine the offset of segment 412 within file 402 based on information in file layout segment 428.

In some examples, determination module 106 may determine that the first segment of the file is required for the security assessment based at least in part on a type of the file. For example, determination module 106 may determine a format of the file based on the type of the file, and use layout information associated with the format of the file to determine the location of one or more segments of interest (e.g., for the security assessment) within the file—including, e.g., the first segment.

Returning to FIG. 3, at step 306 one or more of the systems described herein may, based on determining that the first segment of the file is required for the security assessment, retrieve the first segment of the file before retrieving a second segment of the file. For example, at step 306 retrieval module 108 may, as part of computing device 202 in FIG. 2, retrieve segment 212 before retrieving segment 214 based on determining that segment 212 is required for the security assessment.

Retrieval module 108 may retrieve the first segment before the second segment in any of a variety of ways. For example, retrieval module 108 may determine and/or identify a specified order in which to download the segments of the file (e.g., based on information about the file layout, information about one or more potential security risks in the file, etc.). Additionally or alternatively, retrieval module 108 may dynamically make a determination to retrieve the first segment before the second segment. For example, one or more of the systems described herein may download a segment, analyze the segment, and the select an additional segment to download based on the analysis of the previously downloaded segment.

Retrieval module 108 may operate in any suitable context. For example, retrieval module 108 may download one or more segments (e.g., as a part of a download manager and/or other data retrieval application) and relay the downloaded segments to a security engine. The security engine may then determine which additional segments, if any, are needed for further analysis of the file and request these additional segments from retrieval module 108. Additionally or alternatively, retrieval module 108 may operate as a part of the security engine and retrieve one or more specified segments by instructing a download manager to retrieve one or more specified segments based on a current state of the security assessment.

In some examples, the second segment may precede the first segment in the file. For example, while retrieval module 108 may download the first segment before the second segment, the second segment may be located at an earlier sequential location (e.g., a smaller offset) within the file. Accordingly, in some examples, retrieval module 108 may download one or more segments of the file out of sequential order. Nevertheless, in some examples, retrieval module 108 may store the segments of the file in correct sequential order (e.g., by populating a sparse file with the segments as they are downloaded). In some examples, as will be described in greater detail below, retrieval module 108 may never download the second segment and/or one or more other segments of the file.

Retrieval module 108 may retrieve the first segment in any of a variety of ways. For example, retrieval module 108 may retrieve the first segment by issuing an HTTP request for the first segment. For example, retrieval module 108 may issue an HTTP request that requests only a specified range of the file (e.g., using a "range units" parameter of HTTP/1.1). In another example, retrieval module 108 may retrieve the first segment by issuing an FTP request. For example, retrieval module 108 may issue an FTP request that includes a download resume request specifying the location of the first segment within the file. In an additional example, retrieval module 108 may retrieve the first segment by prioritizing the first segment within a peer-to-peer file sharing application.

Using FIG. 4 as an example, at step 306 retrieval module 108 may retrieve segment 412 before retrieving segment 410 (e.g., even though segment 410 precedes segment 412 in file 402). In some examples, retrieval module 108 may never retrieve segment 410.

Returning to FIG. 3, at step 308 one or more of the systems described herein may determine, based at least in part on the first segment, that the file includes a security risk. For example, at step 308 assessment module 110 may, as part of computing device 202 in FIG. 2, determine, based at least in part on segment 212, that file 210 includes a security risk.

Assessment module 110 may determine that the file includes a security risk in any suitable manner. For example, assessment module 110 may determine that the file includes a security risk by identifying a malware signature within the first segment. For example, assessment module 110 may identify the malware signature as a string within the first segment. Additionally or alternatively, assessment module 110 may derive the malware signature from the first segment. In some examples, assessment module 110 may identify the malware signature solely from the first segment. Alternatively, assessment module 110 may identify the malware signature based partly on the first segment and partly on one or more additional downloaded segments.

In some examples, assessment module 110 may determine that the file includes a security risk based at least in part on the first segment by using the first segment to identify at least one additional segment of interest. For example, assessment module 110 may identify, based at least in part on the first segment, a third segment of the file that is required for the security assessment. Assessment module 110 may then, based on determining that the third segment of the file is required for the security assessment, retrieve the third segment of the file before retrieving the second segment of the file.

Using FIG. 4 as an example, one or more of the systems described herein may download file layout segment 428 and determine that segment 412 is relevant to the security assessment. These systems may then download segment 412 (e.g., without having downloaded segment 410) and scan segment 412 for a malware fingerprint. In this example, these systems may not find a malware fingerprint (or an indication of a malware fingerprint) in segment 412. Accordingly, these systems may then consult file layout segment 428, identify segment 418 as an additional segment of interest, and download segment 418. Assessment module 110 may then determine that segment 418 may indicate malware in file 402, but that segment 420 is needed to confirm the security risk. Accordingly, one or more of the systems described herein may also download segment 420 and assessment module 110 may determine, based on segment 420, that file 402 includes malware.

In some examples, assessment module 110 may determine that the file includes the security risk before downloading the entire file. For example, assessment module 110 may identify one or more malware fingerprints in one or more downloaded segments of the file before having downloaded every segment of the file (or even without having downloaded every segment of the file in sequence up to a segment in the file which contained a malware fingerprint).

In some examples, assessment module 110 may terminate an attempt to download the file before retrieving every segment of the file. For example, assessment module 110 may terminate the attempt to download the file before retrieving the second segment based on determining that the file includes the security risk. In some examples, assessment module 110 may terminate the attempt to download the file before downloading any additional segments of the file after downloading the first segment.

Upon determining that the file includes the security risk, in some examples assessment module 110 may perform one or more security tasks. For example, assessment module 110 may generate and/or send a report of the security risk of the file to an administrator and/or a security vendor. Additionally or alternatively, assessment module 110 may add an identifier and/or a location of the file to a security risk database (e.g., as a part of a web crawler searching the Internet for malicious files). In some examples, assessment module 110 may delete downloaded segments of the file. Additionally or alternatively, assessment module 110 may notify a user that the file includes a security risk. In some examples, assessment module 110 may query the user if the user wishes to continue to download the file anyway. In these examples, assessment module 110 may also quarantine the file and/or place the file in a virtualized environment to protect the computing system to which the file was downloaded.

As explained above, by determining the order in which one or more portions of a file are downloaded such that portions of the file needed for a security assessment are downloaded first, the systems and methods described herein may identify security risks in downloads earlier (e.g., without waiting for a file to entirely download or waiting for relevant portions of the file to download in order), thereby potentially saving time and/or computing resources (e.g., network bandwidth, I/O resources, etc.).

Figure 5:
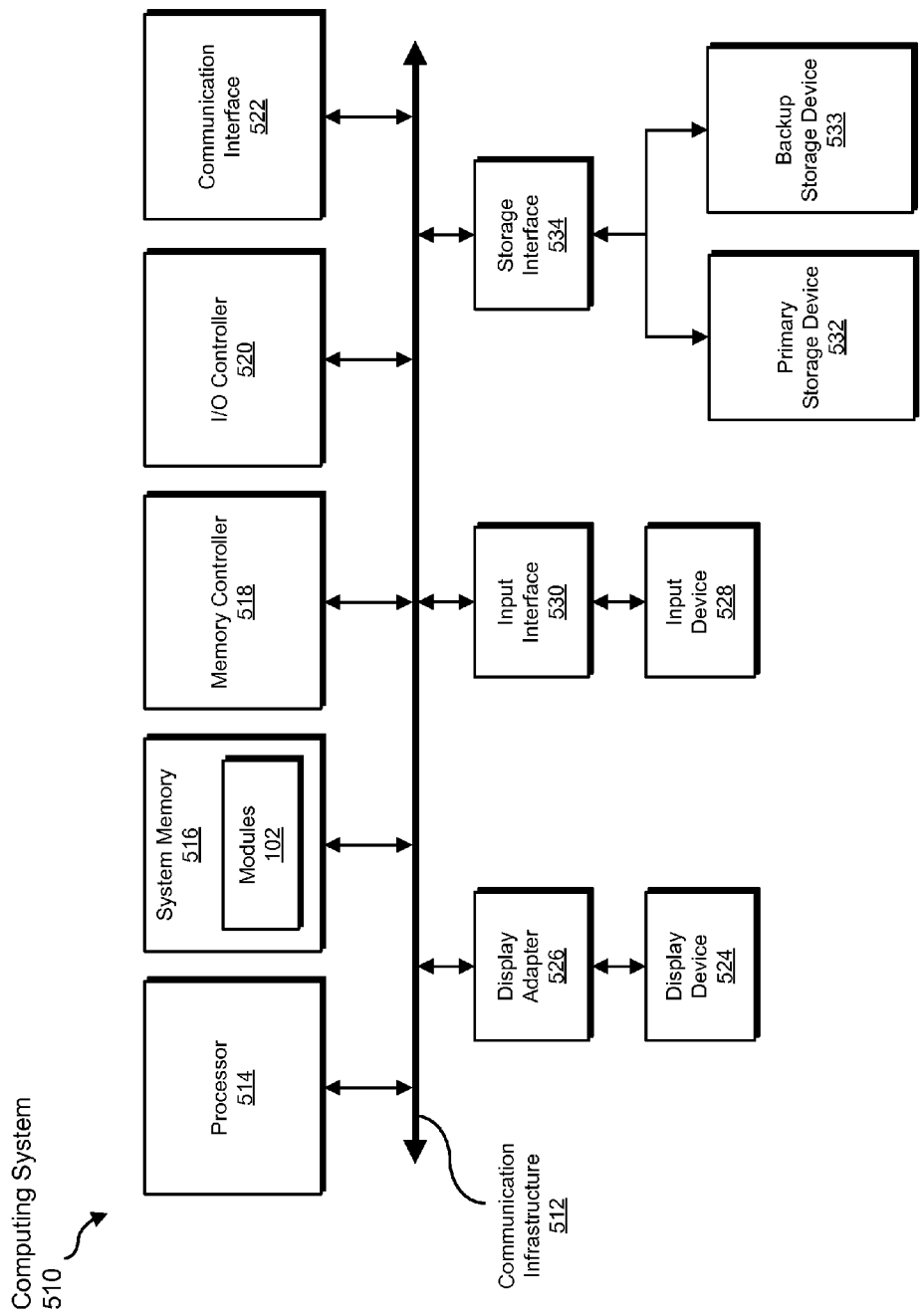
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, retrieving, and terminating steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions.

Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
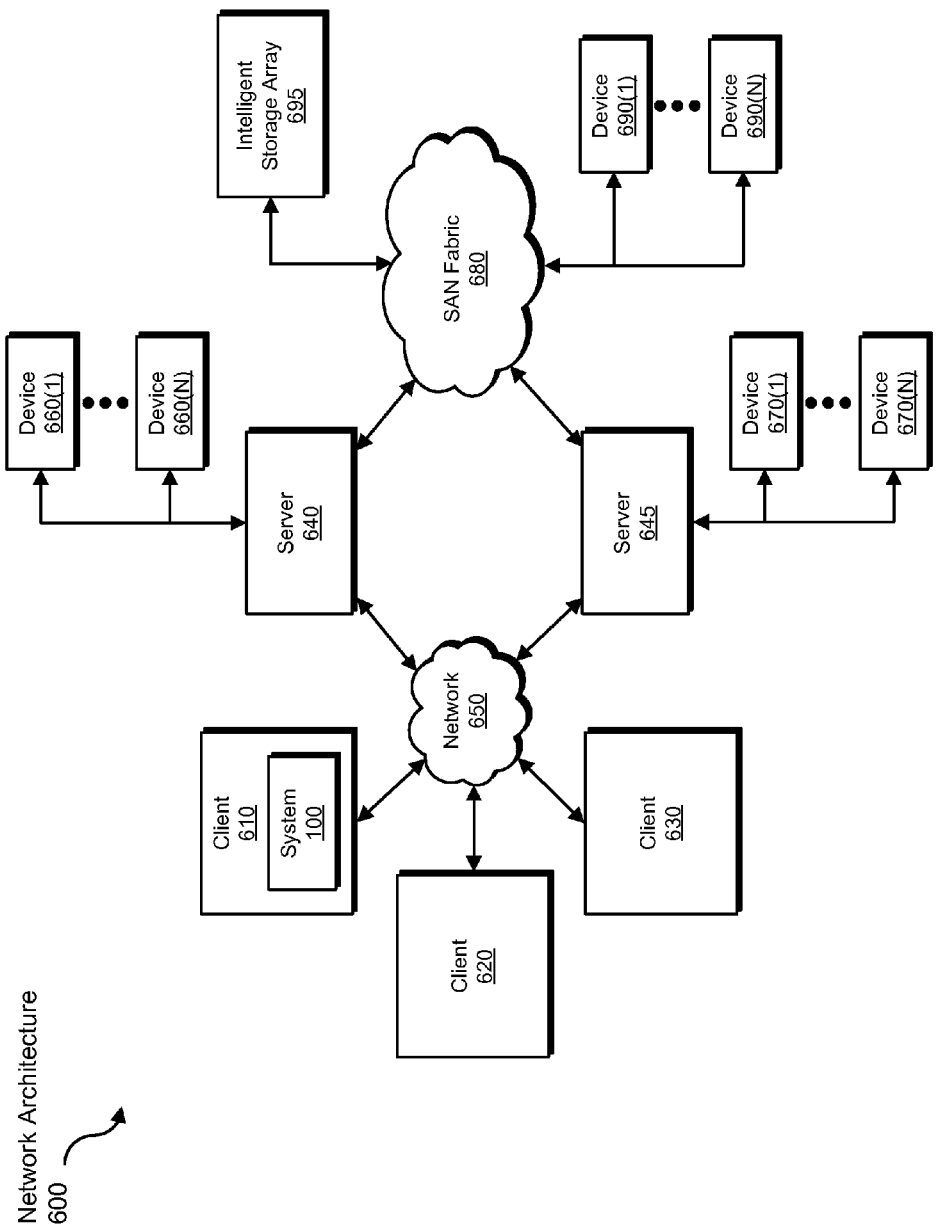
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, retrieving, and terminating steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for identifying security risks in downloads.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for identifying security risks in downloads.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for identifying security risks in downloads, the method comprising:
    identifying a request to download a file that is subject to a security assessment;
    determining that a first segment of the file is required for the security assessment, the file comprising a second segment that precedes the first segment in the file, at least in part by:
        identifying a layout segment of the file, the layout segment comprising layout information for the file; and
        identifying the first segment of the file based on the layout information;
    based on determining that the first segment of the file is required for the security assessment, downloading the first segment and the second segment out of sequential order by downloading the first segment of the file before downloading the second segment of the file; and
    determining, based at least in part on the first segment, that the file comprises a security risk, by identifying a malware signature within the first segment, before the file is entirely downloaded,
    wherein at least a portion of the method is performed by a computing device comprising at least one processor.

2. The computer-implemented method of claim 1, further comprising:
    placing the file in a virtualized environment to protect a computing system to which the file was downloaded.

3. The computer-implemented method of claim 1, further comprising terminating an attempt to download the file before downloading the second segment based on determining that the file comprises the security risk before the file is entirely downloaded.

4. The computer-implemented method of claim 1, wherein determining, based at least in part on the first segment, that the file comprises the security risk before the file is entirely downloaded comprises:
    identifying, based at least in part on the first segment, a third segment of the file that is required for the security assessment; and
    based on identifying the third segment of the file that is required for the security assessment, downloading the third segment of the file before downloading the second segment of the file.

5. The computer-implemented method of claim 1, wherein the layout segment includes metadata indicating offsets of one or more sections within the file.

6. The computer-implemented method of claim 1, wherein the layout segment includes a dictionary at the end of the file indicating a location within the file of one or more sections of the file.

7. The computer-implemented method of claim 1, wherein determining that the first segment of the file is required for the security assessment is based at least in part on a type of the file.

8. The computer-implemented method of claim 1, further comprising:
    notifying a user that the file includes the security risk; and
    querying the user to determine whether the user wishes to continue the download.

9. A system for identifying security risks in downloads, the system comprising:
    an identification module programmed to identify a request to download a file that is subject to a security assessment;
    a determination module programmed to determine that a first segment of the file is required for the security assessment, the file comprising a second segment that precedes the first segment in the file, at least in part by:
        identifying a layout segment of the file, the layout segment comprising layout information for the file; and
        identifying the first segment of the file based on the layout information;
    a retrieval module programmed to, based on determining that the first segment of the file is required for the security assessment, download the first segment and the second segment out of sequential order by downloading the first segment of the file before downloading the second segment of the file;
    an assessment module programmed to determine, based at least in part on the first segment, that the file comprises a security risk, by identifying a malware signature within the first segment, before the file is entirely downloaded; and
    at least one hardware processor configured to execute the identification module, the determination module, the retrieval module, and the assessment module.

10. The system of claim 9, wherein the determination module is programmed to determine that the first segment of the file is required for the security assessment based at least in part on a type of the file.

11. The system of claim 9, wherein the assessment module is further programmed to terminate an attempt to download the file before downloading the second segment based on determining that the file comprises the security risk before the file is entirely downloaded.

12. The system of claim 9, wherein the assessment module is programmed to determine, based at least in part on the first segment, that the file comprises the security risk before the file is entirely downloaded by:
- identifying, based at least in part on the first segment, a third segment of the file that is required for the security assessment; and
- based on identifying the third segment of the file that is required for the security assessment, downloading the third segment of the file before downloading the second segment of the file.

13. The system of claim 9, wherein
the layout segment includes metadata indicating offsets of one or more sections within the file.

14. The system of claim 9, wherein the layout segment includes a dictionary at the end of the file indicating a location within the file of one or more sections of the file.

15. The system of claim 10, wherein the determination module is programmed to determine that the first segment of the file is required for the security assessment at least in part by:
- determining a format of the file based on the type of the file; and
- using layout information associated with the format of the file to determine a location of one or more segments of interest within the file.

16. The system of claim 9, wherein the assessment module is programmed to quarantine the file by placing the file in a virtualized environment to protect a computing system to which the file was downloaded.

17. A non-transitory computer-readable-storage medium comprising one or more computer-executable instructions that, when executed by at least one processor of a computing device, cause the computing device to:
- identify a request to download a file that is subject to a security assessment;
- determine that a first segment of the file is required for the security assessment, the file comprising a second segment that precedes the first segment in the file, at least in part by:
  - identifying a layout segment of the file, the layout segment comprising layout information for the file; and
  - identifying the first segment of the file based on the layout information;
- based on determining that the first segment of the file is required for the security assessment, download the first segment and the second segment out of sequential order by downloading the first segment of the file before downloading the second segment of the file;
- determine, based at least in part on the first segment, that the file comprises a security risk, by identifying a malware signature within the first segment, before the file is entirely downloaded.

18. The non-transitory computer-readable-storage medium of claim 17, wherein the one or more computer-executable instructions cause the computing device to determine that the first segment of the file is required for the security assessment based at least in part on a type of the file.

19. The non-transitory computer-readable-storage medium of claim 17, wherein the one or more computer-executable instructions further cause the computing device to terminate an attempt to download the file before downloading the second segment based on determining that the file comprises the security risk before the file is entirely downloaded.

20. The non-transitory computer-readable-storage medium of claim 17, wherein the one or more computer-executable instructions cause the computing device to determine, based at least in part on the first segment, that the file comprises the security risk before the file is entirely downloaded by causing the computing device to:
- identify, based at least in part on the first segment, a third segment of the file that is required for the security assessment; and
- based on identifying the third segment of the file that is required for the security assessment, download the third segment of the file before downloading the second segment of the file.

* * * * *